(12) United States Patent
Roodenburg et al.

(10) Patent No.: US 10,125,895 B2
(45) Date of Patent: Nov. 13, 2018

(54) MARINE PIPELINE INSTALLATION VESSEL AND METHOD

(71) Applicant: ITREC B.V., Schiedam (NL)

(72) Inventors: Joop Roodenburg, Delft (NL); Terence Willem August Vehmeijer, The Hague (NL); Stefan Cornelis Van Ruyven, De Lier (NL)

(73) Assignee: ITREC B.V., Schiedam (NL)

( * ) Notice: Subject to any disclaimer, the term of this patent is extended or adjusted under 35 U.S.C. 154(b) by 61 days.

(21) Appl. No.: 15/480,173

(22) Filed: Apr. 5, 2017

(65) Prior Publication Data

US 2017/0268699 A1 Sep. 21, 2017

Related U.S. Application Data

(63) Continuation of application No. 14/770,710, filed as application No. PCT/NL2014/050176 on Mar. 21, 2014, now Pat. No. 9,631,742.

(30) Foreign Application Priority Data

Mar. 22, 2013 (NL) .................................... 2010511

(51) Int. Cl.
*F16L 1/19* (2006.01)
*F16L 1/23* (2006.01)
(Continued)

(52) U.S. Cl.
CPC .............. *F16L 1/205* (2013.01); *B63B 35/03* (2013.01); *F16L 1/19* (2013.01); *F16L 1/203* (2013.01);
(Continued)

(58) Field of Classification Search
None
See application file for complete search history.

(56) References Cited

U.S. PATENT DOCUMENTS 6,371,694 B1 * 4/2002 de Varax ................. B63B 35/03
405/158
6,796,742 B1 * 9/2004 Roger .................. B23K 9/0286
405/166

(Continued)

FOREIGN PATENT DOCUMENTS

BR PI 0621517-3 A2 9/2012
GB 2 439 295 A 12/2007
(Continued)

*Primary Examiner* — Benjamin F Fiorello
*Assistant Examiner* — Douglas S Wood
(74) *Attorney, Agent, or Firm* — Birch, Stewart, Kolasch & Birch, LLP

(57) ABSTRACT

A marine pipeline installation vessel for laying a pipeline on the seabed, the vessel at least being adapted to carry out the reel lay method, wherein the vessel includes at least a first and a second storage reel for storage of the pipeline to be laid, which storage reels are positioned in or onto the vessel; a pipeline launch tower mounted to the vessel, which pipeline launch tower is adapted to launch the pipeline in a firing line along the tower; a pipeline guide which is mounted at an elevated position to the pipeline launch tower, which pipeline guide has a pipeline guide surface member providing an essentially circular or semi-circular pipeline guide surface, which pipeline guide is adapted to—in a primary pipelaying position thereof relative to the tower—guide a pipeline from a first storage reel over the pipeline guide into the firing line, the pipeline contacts the pipeline guide surface at a first contact point fore of the firing line and departs the surface at a first departure point into the firing line.

22 Claims, 14 Drawing Sheets

(51) Int. Cl.
*F16L 1/12* (2006.01)
*F16L 1/26* (2006.01)
*F16L 1/00* (2006.01)
*F16L 1/20* (2006.01)
*F16L 1/16* (2006.01)
*B63B 35/03* (2006.01)
*F16L 1/235* (2006.01)

(52) U.S. Cl.
CPC ................ *F16L 1/207* (2013.01); *F16L 1/23* (2013.01); *F16L 1/235* (2013.01)

(56) References Cited

U.S. PATENT DOCUMENTS

| | | | | |
|---|---|---|---|---|
| 7,581,904 B2 * | 9/2009 | Bursaux | ................ | F16L 1/203 405/166 |
| 8,905,676 B2 * | 12/2014 | Roodenburg | ............. | F16L 1/19 405/168.1 |
| 8,915,674 B2 * | 12/2014 | Feijen | ...................... | F16L 1/16 405/166 |
| 2003/0091395 A1 | 5/2003 | Stockstill | | |

FOREIGN PATENT DOCUMENTS

| | | | |
|---|---|---|---|
| GB | 2 469 519 A | 10/2010 | |
| WO | WO 2007/108673 A1 | 9/2007 | |
| WO | WO 2011/016719 A1 | 2/2011 | |
| WO | WO 2012/091556 A1 | 7/2012 | |
| WO | WO-2012091556 A1 * | 7/2012 | ................ F16L 1/19 |

* cited by examiner

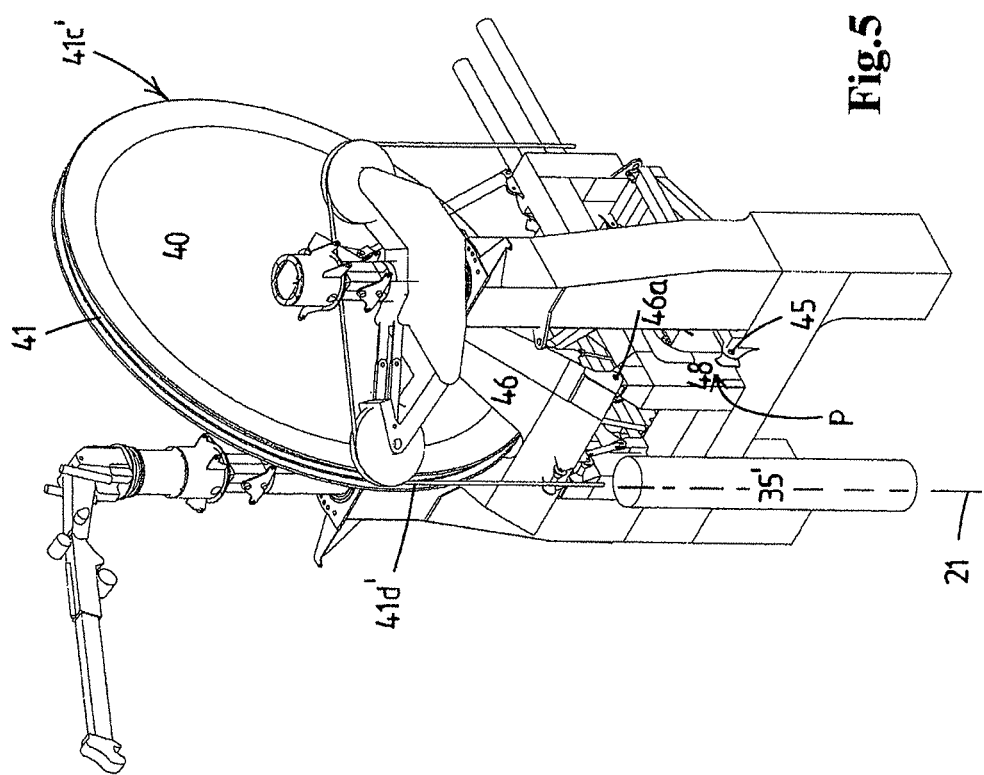

MARINE PIPELINE INSTALLATION VESSEL AND METHOD

CROSS-REFERENCE TO RELATED APPLICATIONS

This application is a Continuation of U.S. patent application Ser. No. 14/770,710, filed on Aug. 26, 2015, which is a National Stage Entry of International Application No. PCT/NL2014/050176 filed on Mar. 21, 2014, which claims the benefit under 35 U.S.C. § 119(a) to Patent Application No. 2010511, filed in Netherlands on Mar. 22, 2013, all of which are hereby expressly incorporated by reference into the present application.

The invention relates to a marine pipeline installation vessel for laying a pipeline on the seabed and a method for laying a pipeline, the vessel at least being adapted to carry out the reel lay method, wherein the vessel comprises:

- at least a first storage reel fore of a moonpool and a second storage reel aft of the moonpool for storage of the pipeline to be laid, positioned in or onto the vessel;
- a pipeline launch tower mounted to the vessel, which pipeline launch tower is adapted to launch the pipeline in a firing line along said tower;
- a pipeline guide which is mounted at an elevated position to the pipeline launch tower, in a primary pipelaying position relative to the tower, which pipeline guide has an essentially circular or semi-circular pipeline guide surface, which pipeline guide is adapted to—in the primary pipelaying position—guide a pipeline from a first storage reel over the pipeline guide into the firing line, wherein said pipeline contacts the pipeline guide surface at a first contact point fore of the firing line and departs said surface at a first departure point into the firing line.

Such a vessel and method is generally known when laying pipelines from a storage reel into a body of water, wherein the pipeline travels from a storage reel via the pipeline guide into the firing line of the launch tower towards a body of water. In order to minimize interruptions of the pipelaying process, multiple reels may be provided, such that when one reel is emptied, pipelaying can be continued using another filled reel. In the meantime, the empty reel may be filled with pipeline or may be exchanged by a filled reel.

An example thereof is disclosed in US patent publication US 2003/0091395 A1, wherein the two storage reels are arranged next to each other and the launch tower is moveable in a transverse direction of the vessel to align with one of the two storage reels. However, moving the entire launch tower including equipment is a disadvantage of this disclosure.

Another example thereof is disclosed in British patent publication GB 2.439.295 A, in which two reels are provided behind each other, so that they both can be aligned with the launch tower at the same time. However, a disadvantage of this disclosure is that this requires a lot of space in the longitudinal direction of the vessel.

It is therefore an object of the invention to provide an improved marine pipeline installation vessel and a method with increased versatility.

In order to meet the abovementioned object, a marine pipeline installation vessel and method is provided wherein a pipeline guide displacement drive is provided which is adapted to displace the pipeline guide with respect to the pipeline launch tower between the primary pipelaying position and a secondary pipelaying position, which pipeline guide is adapted to—in the secondary pipelaying position—guide a pipeline from a second storage reel over the pipeline guide into the firing line, wherein said pipeline contacts the pipeline guide surface at a second contact point aft of the firing line and departs said surface at a second departure point into the firing line, wherein the first and second departure points are both in the firing line, and wherein the first and second contact points are positioned fore and aft of the firing line, respectively.

An advantage of the configuration according to the present invention is that guidance of a pipeline to be laid is possible both from the fore, and from the aft side of the firing line via the same pipeline guide.

In a possible embodiment, storage reels are provided which are arranged on the vessel at opposite sides of the pipeline launch tower, fore and aft of the firing line and of the pipeline launch tower. In particular, a first storage reel is arranged fore of the firing line and a second storage reel is arranged aft of the firing line. Possibly, the first contact point of the pipeline guide faces towards one of the two storage reels and the opposed second contact point faces towards the other one of the two storage reels. The possibility to arrange the storage reels at both sides of the launch tower makes it possible to position the launch tower at or near a center of the vessel and to optimize the mass distribution on the vessel by appropriate positioning of the storage reels. Hence, a more flexible design is provided allowing more or better options than prior art vessels.

Alternatively, the storage reels may be positioned on the same side of the firing line, but the pipeline from at least one storage reel is guided via additional guide devices to the other side of the firing line.

It is noted that the primary and secondary pipelaying positions define different interaction points of the pipeline with the pipeline guide during different pipelaying positions. These interaction points are in particular at different remote locations in plan view. This allows the entry of pipeline from different reels, positioned at different locations with respect to the pipeline guide. In other words, the position of the pipeline guide is adapted to the contact point of the pipeline, extending from a storage reel, while maintaining a departure point in the firing line. It is further noted that the contact and departure points do not relate to specific structural parts or portions of the pipeline guide, as these points are dependent on the relative configuration of storage reel, pipeline guide and firing line. Moreover, in an embodiment the storage reel is mounted pivotably to the pipeline launch tower about a horizontal pipeline guide axis, allowing the pipeline guide to pivot, hence, the points on the guide are variable.

By displacing the pipeline guide with respect to the pipeline launch tower from the primary pipelaying position to the secondary pipelaying position both the contact and the departure point of the primary pipelaying position will be displaced.

In an embodiment where the first and second contact points are geometrically opposite, the portion of the pipeline guide where in the primary pipelaying position the first contact point is situated, will in the secondary pipelaying position include the second departure point, and analogously, the portion of the pipeline guide where in the primary pipelaying position the first departure point is situated, will in the secondary pipelaying position include the second contact point. In other words, "entry" becomes "exit" and vice versa.

In an embodiment, a pipeline straightening assembly is mounted to the pipeline guide which is displaceable together with the pipeline guide. For rigid reel lay, the straightening assembly is indispensable. The straightening assembly may comprise one or more straightening tracks, common items used to undo plastic deformation of the pipeline. The straightening assembly preferably comprises two straightening tracks, each one being supported individually by the pipeline guide support frame. Configurations comprising three tracks are also commonly applied.

Preferably, in either the primary or the secondary pipelaying position the pipeline straightening assembly is provided downstream of the pipeline guide adjacent the departure point and adjacent the firing line to straighten the pipeline, and in the other of primary or secondary pipelaying position the pipeline straightening assembly is displaced to a non-operable position, remote from the firing line.

This embodiment is in particular advantageous as it allows a switch between rigid reel lay and laying flexibles, wherein use is made of the same pipeline guide. The advantage of a non-operable position of the straightener is that this allows the passage of larger items over the pipeline guide, and/or allows the pipeline guide to be used for laying flexible pipelines. In an embodiment, the non-operable position is below the pipeline guide surface, and/or at a lower portion of the pipeline guide. In general, the greatest difficulties that occur during the pipelaying process take place during the beginning, changing or ending of the pipelaying process. In particular when laying flexibles (flexible pipelines), long end fittings may be placed at the beginning and/or ending of the pipeline to make it possible to connect the pipes together. To handle such end fittings, the presence of the straightening assembly is in general an obstacle. With the vessel according to the present invention in which the straightening assembly is displaceable together with the pipeline guide, this problem is advantageously solved. In the primary pipelaying position, rigid reel lay may be performed, in which the straightening assembly is provided downstream of the pipeline guide adjacent the first departure point in the firing line to straighten the pipeline. After displacement of the pipeline guide and the straightening assembly to the secondary pipelaying position, in which the straightening assembly is displaced to a non-operable position, preferably below or at a lower portion of the pipeline guide, flexible pipelaying may be pursued, having a cleared firing line allowing the passage of larger items. It is noted that analogously, flexible pipelaying may be performed in the primary pipelaying position and laying rigid pipelines may be allowed in the secondary pipelaying position.

Hence, the improved configuration according to the present invention allows a larger variety of vessel configurations including a pipeline launch tower and two or more storage reels, possibly comprising storage reels comprising a different type of pipe, in particular rigid reel lay pipe and flexible pipe. Advantageously, the launch tower does not have to be movable to align with the storage reels. The configuration is further advantageous in view of strength and stability of the vessel.

According to the invention, the vessel comprises at least a first and a second storage reel for storage of the pipeline to be laid, which storage reels are positioned in or onto the vessel. The storage reels may for example be provided on deck or inside the hull of the vessel. A storage reel may as desired have a vertical or horizontal axis of rotation, wherein a horizontal axis of rotation possibly extends parallel to the horizontal pipeline guide axis. A vertically oriented rotation axis, i.e. the rotation axis extends in a vertical direction, allows the storage reel to be placed below deck. An advantage of the invention is the increased design flexibility, allowing multiple configurations of reels and launch tower that may be optimized for mass distribution of the vessel or barge, or flexibility on deck for other purposes, or any other conceivable design consideration. The reels may be adapted to store rigid pipelines and/or flexible pipelines. According to the invention, a pipeline launch tower is mounted to the vessel, which pipeline launch tower is adapted to launch the pipeline in a firing line along said tower. The vessel according to the present invention may be monohull vessel, a semi-submersible or any other type of pipelaying barge. Possibly, he launch tower is mounted pivotable to the vessel about an essentially horizontal tower pivot axis to adjust inclination of the tower. This allows the vessel to adapt to different pipelaying conditions, e.g. caused by the pipelaying depth. Preferably, the firing line extends essentially vertically or at an angle of at most 60° with respect to the vertical. The pipeline launch tower may be of a closed or open construction, and in view of the increased operational options according to the present invention, the tower may also be referred to as a multilay tower.

The firing line is situated in along the pipeline launch tower. Preferably, the pipeline launch tower and the firing line provided adjacent each other in the longitudinal plane of the vessel. It is both conceivable that the tower is situated at the foreside of the vessel relative to the firing line, and that the firing line is situated at the foreside of the vessel, relative to the pipeline launch tower.

The vessel may further be provided with one or more tensioners, in an operational position preferably supported by the tower and positioned in the firing line, carrying the weight of the already laid pipeline. Tensioners are well known in the art of marine pipelaying. Commonly such tensioners include a tensioner frame and multiple, e.g. four endless tracks supported in a mobile manner to allow for variation of the gap between the tracks to at least accommodate various pipeline diameters. Said tracks are adapted for engaging the pipeline and supporting at least part of the weight of the launched pipeline, the tensioner frame being supported by said tower via an associated tensioner support assembly. Basically any suitable tensioner can be employed in conjunction with the present inventive pipelaying vessel and method. Preferably, the tensioner frame (and the tracks arranged therein) can be displaced with respect to the tower between an active position, in which the firing line extends through the tensioner frame between the tracks, so that the tracks can engage on a pipeline, and a retracted position, in which the firing line extends outside the frame of the tensioner to allow the passage of a large accessory.

According to the invention, a pipeline guide is provided which is mounted at an elevated position to the pipeline launch tower, in a primary pipelaying position relative to the tower, for guiding the pipeline between a storage reel and the firing line. According to the invention, pipeline guide has an essentially circular or semi-circular pipeline guide surface. Preferably, the pipeline guide surface is provided radially about an essentially horizontal center. In an embodiment, the pipeline guide comprises a semi-circular curved arm or a circular wheel, e.g. a pipeline aligner wheel.

The pipeline guide according to the invention is configured to—in the primary pipelaying position—guide a pipeline from a first storage reel over the pipeline guide into the firing line, wherein said pipeline contacts the pipeline guide surface at a first contact point fore of the firing line and departs said surface at a first departure point into the firing line, and configured to—in the secondary pipelaying position—guide a pipeline from a second storage reel over the pipeline guide into the firing line, wherein said pipeline contacts the pipeline guide surface at a second contact point aft of the firing line and departs said surface at a second departure point into the firing line, wherein the first and second departure points are both in the firing line, and wherein the first and second contact points are positioned fore and aft of the firing line, respectively. It is noted that the pipeline guide in both the primary and secondary pipelaying position extends preferably essentially in the longitudinal plane of the vessel.

According to the invention, the pipeline guide is mounted at an elevated position to the pipeline launch tower, and the pipeline guide is displaceable with respect to the pipeline launch tower between the primary pipelaying position and the secondary pipelaying position. Hence, the pipeline guide mounted movable to the pipeline launch tower. It is conceivable that the pipeline guide is mounted pivotably to the pipeline launch tower. The pipeline guide may both be allowed to pivot (rotate) about an essential vertical pipeline guide axis with respect to the pipeline launch tower, as well as to pivot about an essentially horizontal pipeline guide axis with respect to the pipeline launch tower.

The pipeline guide according to the invention has an essentially circular or semi-circular pipeline guide surface. Preferably, the essentially circular or semi-circular pipeline guide surface is provided radially about an essentially horizontal center, which is preferably parallel to the pipeline guide axis. In an embodiment, the pipeline guide comprises a pivotable arm between the pipeline guide axis and the center of the pipeline guide surface. Displacement between the primary and secondary pipelaying position may involve pivoting of the pivotable arm about the horizontal pipeline guide axis The present invention is characterized in that a pipeline guide displacement drive is provided which is adapted to move the pipeline guide with respect to the pipeline launch tower between the primary pipelaying position and the secondary pipelaying position.

In a preferred embodiment, the pipeline guide displacement drive is adapted to displace the pipeline guide from a pipelaying position away from the firing line and towards the pipeline launch tower to a retracted, non-operable position wherein the entire pipeline guide is positioned away from the firing line at the side of the pipeline launch tower, such that the firing line is free to perform other operations. This is in particular useful when large accessories have to be installed in the pipeline. When removing the pipeline guide from the firing line, the firing line is cleared to allow accessories to enter the firing line. This is e.g. advantageous during pipelaying including large end fittings, but also during PLET handling, and handling Single Line Offset Risers (SLOR) and Concentric Offset Risers (COR). The non-operable position may further be useful when the vessel is also used for J-lay pipelaying in which case there is no need for a pipeline guide as used in reel pipelaying.

The pipeline guide is in the non-operable position is displaced towards the pipeline launch tower. Hence, the area around the firing line is cleared in its entirety by displacing the pipeline guide to a retracted position in which the entire pipeline guide is retracted into (or even partly beyond) the pipeline launch tower.

Possibly, the pipeline guide displacement drive is adapted to displace the pipeline guide away from the firing line to an overload protection position wherein the pipeline trajectory between the second storage reel and the second contact point has been shortened. Such an overload protection position allows the guide to move towards the storage reel, to prevent an overload on the pipeline. In the embodiment wherein the pipeline guide support frame is allowed to move to an overload protection position and wherein a pipeline straightening assembly is present, the straightening assembly is preferably allowed to move together with the pipeline guide.

In an embodiment, the pipeline guide displacement drive comprises one or more actuators, e.g. hydraulic cylinders, for displacing the pipeline guide at least between the primary and secondary pipelaying position, and possibly also to a non-operable position and/or overload protection position.

Yet alternatively, it is also conceivable that a crane is used to displace the pipeline guide between the primary pipelaying position and the secondary pipelaying position. This may be e.g. a small knuckle boom crane, provided at the top of the pipeline launch tower, or any other crane, e.g. a deck crane, available on vessel comprising the vessel according to the present invention.

Yet alternatively, in an embodiment wherein pipeline guide is mounted pivotably to the pipeline launch tower about a pipeline guide axis, it is also conceivable that electric engines are provided at the pipeline guide axis to allow a pivot of the pipeline guide, allowing a displacement of the pipeline guide between the primary pipelaying position and the secondary pipelaying position.

In a possible embodiment, the pipeline guide displacement drive is adapted to translate the pipeline guide with respect to the pipeline launch tower in the plane of the essentially circular or semi-circular pipeline guide surface. Movement in the plane of the semi-circular pipeline guide can e.g. be effectuated by allowing a pivotably mounted pipeline guide to pivot about a horizontal pipeline guide axis.

Alternatively, the pipeline guide displacement drive may also be adapted to move the pipeline guide with respect to the pipeline launch tower by allowing the pipeline guide to rotate about an essential vertical axis.

The invention also relates to a method for installing an offshore pipeline, wherein use is made of a vessel according to the invention. Possibly, the method comprises the following steps:
carrying out pipelaying using the first storage reel;
interrupting pipelaying;
moving the pipeline guide to the secondary pipelaying position; and
continuing pipelaying with the second storage reel.

In an embodiment, use is made of a vessel wherein the pipeline guide displacement drive is adapted to move the pipeline guide with respect to the pipeline launch tower to a retracted, non-operable position wherein the first and second departure points of the pipeline guide are displaced away from the firing line, such that the firing line is free to perform other operations, and wherein the vessel furthermore comprises J-lay equipment. The method including the step of moving the pipeline guide to the retracted, non-operable position to create space for effecting J-lay pipelaying using said J-lay equipment.

In an embodiment, use is made of a vessel comprising a straightening assembly, supported by the pipeline guide support frame, which in the primary pipelaying position is provided downstream of the pipeline guide adjacent the first departure point and adjacent the firing line to straighten the pipeline, and which in the secondary pipelaying position is displaced to a non-operable position, remote from the firing line, further comprising a reel with a rigid pipeline and a reel with a flexible pipeline, preferably arranged at opposite sides of the pipeline launch tower, wherein the method comprises the following steps:
providing the pipeline guide in the primary pipelaying position;

carrying out rigid pipelaying, using the straightening assembly in the firing line;
interrupting pipelaying;
moving the pipeline guide to the second pipelaying position and the straightening assembly to the non-operable position;
and continuing flexible pipelaying without the straightening assembly in the firing line.

The present invention also relates to a marine pipeline installation vessel for laying a pipeline on the seabed, said vessel at least being adapted to carry out the reel lay method, wherein the vessel comprises:
a storage reel for storage of the pipeline to be laid,
a pipeline launch tower mounted to the vessel, which pipeline launch tower is adapted to launch the pipeline in a firing line along said tower;
a pipeline guide which is mounted at an elevated position to the pipeline launch tower, which pipeline guide has pipeline guide surface member providing an essentially circular or semi-circular pipeline guide surface, which pipeline guide is adapted to guide a pipeline from a storage reel over the pipeline guide into the firing line,
characterized in that
the pipeline guide comprises a base frame member which supports thereon a pipeline straightening assembly, wherein the base frame member is pivotally connected about an axis to the tower, so that base frame member is pivotal between a first position, wherein the straightening assembly is aligned with the firing line, and a second position, wherein the base frame member and the straightening assembly are remote from the firing line,
and in that a displacement drive for the base frame member is provided that comprises one or more drive members, e.g. hydraulic cylinders, that are arranged between the tower and the base frame member to perform the tilting of the member,
and that the pipeline guide surface member is supported by a pipeline guide support frame member, e.g. an arm member, that is supported by the base frame member so as to pivot along with the base frame member.

Preferably the pipeline guide support frame member is movable connected to the base frame member so as to allow at least for adjustment of the pipeline guide surface member relative to the firing line. For example one or more hydraulic cylinders are provided to act as an adjustment drive arranged between the pipeline guide support frame member and the base frame member.

Possibly the mobility of the pipeline guide support frame member relative to the base frame member may be a translator/motion, but it is preferred that the pipeline guide support frame member is pivotally connected to the base frame member about a pivot axis. In a preferred embodiment the adjustment drive is embodied as a pipeline tension controller for the pipeline towards the pipeline guide.

The elements of the straightening assembly, e.g. tracks and possibly one or more adjusters that allow for positioning of the tracks are mounted on the base frame member.

As will be appreciated in a preferred embodiment the pipeline guide is embodied such that in a primary position thereof the pipeline guide is directed aft of the firing line and in a secondary position fore of the firing line.

The invention will now be described in a non-limiting way by reference to the accompanying drawings in which like parts are indicated by like reference numerals, and in which:
FIG. 1 depicts schematically a marine pipeline installation vessel according to an embodiment of the invention;

FIG. 2 partially shows an alternative embodiment of a marine pipeline installation vessel according to the invention in a plan view;
FIG. 3 depicts a marine pipeline installation vessel according to an alternative embodiment of the invention in the secondary pipelaying position in side view;
FIGS. 4 and 4*a* show in detail the top end of the pipeline launch tower schematically in the secondary pipelaying position;
FIGS. 5 and 5*a* depict the top end of FIG. 4 in the primary pipelaying position;
FIG. 6 depicts the top end of FIG. 4 in the non-operable retracted position;
FIG. 7 depicts the marine pipeline installation vessel of FIG. 4, wherein the pipeline guide is in the retracted, non-operable position in side view,
FIG. 8 depicts the marine pipeline installation vessel of FIG. 7 wherein J-lay pipelaying is performed,
FIGS. 9-13 show an alternative version of the top end of the tower FIG. 1 depicts schematically a marine pipeline installation vessel VE according to an embodiment of the invention to lay a pipeline. The vessel VE is adapted to lay pipeline on the seabed at least by means of the reel lay pipelaying method of which the general principles are commonly known to the skilled person. The vessel has a front or bow side VE' and a stern of aft side VE". The vessel may be a mono-hull vessel as shown herein, but other hull designs, e.g. a twin-hull semi-submersible, are also contemplated.

As will be explained below with reference to other embodiment, the vessel VE can for example also be embodied for the J-lay pipelaying method. The vessel has a pipeline launch tower PLT. The tower PLT is adapted to launch a pipeline to be laid in a firing line FL or pipelaying axis that extends along the tower PLT.

The tower PLT is provided with one or more pipeline tensioners TE, commonly equipped with pipeline engaging tracks, which tensioners TE are adapted to carry the weight of the launched pipeline during pipelaying.

The tensioners are attached to the tower PLT, preferably in a manner so as to be each movable between an operative position, wherein the firing line FL extends through the tensioner TE, and a retracted position, wherein the tensioner TE is remote from the firing line, and a clear envelope around the firing line FL is provided. For example the tower PLT is provided with one or more retractable tensioners as explained in WO2007/108673 which is incorporated herein by reference.

For example in the retracted position of the tensioner TE a clear envelope is present around the firing line FL having a minimum distance to said tensioner TE of at least one meter, preferably at least 2 meters.

For example hydraulic cylinders are provided for displacing the tensioner TE between the operative and retracted positions.

For example a tensioner TE support by parallel bar linkage on the tower.

For example the tower PLT comprises two spaced apart main beams interconnected by a number of cross beams, wherein the one or more tensioners TE in their retracted position located at least partly between said main beams.

In this example the vessel VE is provided with two storage reels SR1, SR2 for storage of a pipeline to be laid. The reels SR1, SR2 are in this embodiment positioned at opposite sides, aft and fore respectively, of the tower PLT.

It is illustrated that the reel SR1 has a horizontal reel axis RRA1 and is arranged above the deck of the vessel, possibly fixed to the hull of the vessel or embodied as a reel module that can be displaced over the deck and possibly even lifted from the deck, e.g. to replace an empty reel by a loaded reel.

It is envisaged that reel SR1 is embodied and used primarily for storage of rigid pipeline to laid such pipeline being subjected to plastic deformation and requiring straightening by a straightener assembly as it leaves the pipeline guide and passes into the firing line FL as is known in the art.

It is illustrated that reel SR2 has a vertical reel rotation axis, as well as being arranged below deck in the hull of the vessel. It is envisaged that reel SR2 is embodied and primarily used for storage of flex pipeline which is launched without requiring a straightening as is known in the art.

Other embodiments of one or both reels SR1, SR2, e.g. with another direction of the reel axis, as well as positions thereof relative to the hull and to the tower PLT, are also possible within the scope of the invention, and some of them will be discussed with reference to other figures.

The tower PLT is arranged at a moonpool MP here, in this example fore of the moonpool so that the firing line FL and the tensioners in their operative position are at the aft side of the tower PLT.

The tower PLT here is—as is preferred—on the central axis of the vessel, as is even more preferred centrally along the length of the vessel. It is noted that one can envisage (less preferred) that the tower and/or moonpool is arranged at another location, e.g. no moonpool being present and the tower being located at a side of the vessel, e.g. at the stern.

Arrangement of the tower PLT at a moonpool MP, and arranging two storage reels SR1, SR2 respectively aft and fore of the tower PLT and the moonpool MP, allows to bring the mass center of the vessel VE close to the moonpool MP, taking into account the often enormous mass of loaded storage reels of such a vessel. This is beneficial in view of vessel motion. The tower PLT is provided—at an elevated position thereof, which is above the one or more tensioners TE on tower PLT—with a pipeline guide PG.

In FIG. 1 the pipeline guide is shown to have a pipeline guide surface member PGSM that forms a circular pipeline guide surface. In the art such a pipeline guide surface member PGSM is also known as an aligner wheel.

In FIG. 1 it is illustrated that the pipeline guide PG further comprises a pipeline guide support frame structure SF that supports the pipeline guide surface member PGSM in a mobile manner relative to the tower PLT.

Here the frame structure SF is embodied with a pivotable base frame member that is pivotable about horizontal pipeline guide axis PGA relative to the tower PLT.

The aligner wheel PGSM is rotatable about axis GRA relative to the frame structure SF.

In an embodiment on can envisage that the axis GRA is mounted on a further pivotal frame member that is pivotal relative to the base member.

The pipeline guide support frame SF and the aligner wheel PGSM are shown in two distinct positions, namely a primary pipelaying position (here aft of the tower PLT) indicated by dashed lines and a secondary pipelaying position (here fore of the tower PLT) indicated by solid lines.

A pipeline guide displacement device (here not shown, but e.g. including one or more hydraulic cylinders between the tower PLT and the frame SF) is provided to displace the pipeline guide PG relative to the pipeline launch tower PLT between the primary and secondary pipelaying position.

In the primary pipelaying position, the pipeline to be launched FPT is spooled from the reel SR1 and passes in a first trajectory to the pipeline guide PG. The pipeline FTP comes into contact with the pipeline guide surface at a first contact point FEP and departs the pipeline guide PG at a first departure point FDP and the continues in the firing line FL.

The first contact point FEP is aft of the firing line FL as the aligner wheel PGSM is aft of the firing line FL, here facing towards the storage reel SR1. The first departure point FDP is in the firing line FL. Hence, in the primary pipelaying position, the pipeline guide PG is configured to guide a pipeline, here rigid pipeline, in a first pipeline trajectory FPT extending between the storage reel SR1 and the firing line FL.

In the secondary pipelaying position, the pipeline SPT, here flex pipeline, to be launched enters the pipeline guide PG at a second contact point SEP and departs the pipeline guide PG at a second departure point SDP in the firing line FL. The second contact point SEP is to the fore of the firing line FL. Here the aligner wheel PGSM is facing towards the storage reel SR2. Thus its position is remote from the first contact point FEP seen in plan view. The second departure point SDP is in the same firing line FL. Hence, in the secondary pipelaying position, the pipeline guide PG is configured to guide a pipeline SPT in a second pipeline trajectory SPT extending between the storage reel SR2 and the firing line FL.

In FIG. 2 an alternative embodiment of a marine pipeline installation vessel according to the invention is partially shown in a plan view.

Similar to the embodiment of FIG. 1, FIG. 2 depicts a pipeline guide PG (e.g. with a pipeline guide surface member that defines a semi-circular pipeline guide surface) and a firing line FL. Other parts of the marine pipeline installation vessel are omitted in FIG. 2 for clarity reasons.

In FIG. 2 the pipeline guide PG is shown on the left of firing line FL in dashed lines in the primary pipelaying position thereby defining the first contact point FEP and the first departure point FDP, and on the right of firing line FL in solid lines in the secondary pipelaying position thereby defining the second contact point SEP and the second departure point SDP. It can be clearly seen that in this plan view, the first and second departure point FDP, SDP are in the firing line FL and the first and second contact point FEP, SEP are positioned at different remote locations, here diametrically opposite of the firing line FL, when seen in a plan view.

In the embodiment of FIG. 1, the pipeline guide PG is displaceable as a translation in the plane of the pipeline guide PG, which is perpendicular to the axis PGA as indicated by arrow TD. Due to this translation of the pipeline guide GD, generally between a fore and aft position, the first departure point FDP lies close to the second contact point SEP, when seen in a plan view.

As an alternative to, or in combination, with a frame structure that allows for a translation motion of the pipeline guide PG, e.g. as in FIG. 1, the pipeline guide PG may include a frame structure that allows for (full or partial, e.g. 180 degrees) rotation about a vertical axis relative to the tower PLT, e.g. an axis coinciding with the firing line FL. This is shown in the plan view of FIG. 2 by arrow RD. A rotation of 180 degrees about the firing line FL seen in plan view will then also position the pipeline guide in a secondary pipelaying position similar to the secondary position shown in FIG. 1. If full or partial rotation is possible by means of the frame structure, the primary and secondary pipelaying positions may possibly be not in a common plane, but at a non-180 degrees angle to one another, such as for instance shown in FIG. 2 on the right of the firing line FL where the pipeline guide PG is shown in dashed lines and defines a second departure point SDP' and a second contact point SEP'.

This moveability of the pipeline guide PG relative to the tower PLT and the firing line FL allows the use of a single pipeline guide PG in combination with two storage reels SR1 and SR2, wherein the one pipeline trajectory from the storage reel SR1 to the pipeline guide reaches the pipeline guide PG from aft of the vessel and the other pipeline trajectory from the storage reel SR2 to the pipeline guide reaches the pipeline guide PG from the fore of the vessel.

In the embodiment of FIG. 1, two storage reels are positioned on opposite sides, fore and aft, of the tower.

In the primary pipelaying position the pipeline guide PG is positioned to receive pipeline from one of the storage reels SR1 and in the secondary pipelaying position the pipeline guide is positioned to receive pipeline from the other storage reel SR2.

It will be apparent to the skilled person that there are configurations conceivable in which more than two storage reels are positioned on the vessel and that the pipeline guide may be positionable in a tertiary pipelaying position or even a quaternary pipelaying position. When the pipeline guide is rotatable about a vertical axis, e.g. the firing line, many positions of the pipeline guide may be possible.

Placing more than two storage reels on the vessel may be advantageous, because pipelaying can then be continued from another storage reel when the currently used storage reel is empty.

For example the following method can be carried out using a vessel according to the invention:
  providing the pipeline guide in the primary pipelaying position;
  carrying out pipelaying with rigid pipeline spooled from a storage reel associated with the primary pipelaying position;
  interrupting pipelaying;
  moving the pipeline guide to the secondary pipelaying position; and
  continuing pipelaying with flex pipeline spooled from a storage reel associated with the secondary pipelaying position.

As explained, in particular for handling rigid pipeline, the vessel further may comprise a straightener assembly ST, e.g. a three-point straightener assembly with multiple tracks for straightening. The straightener ST is not necessary per se, for instance when only flexible pipelines are used for pipelaying, but the presence of the straightener increases the versatility of the vessel, because it is then for instance possible to carry out pipelaying with rigid pipe using storage reel SR1 and the straightener and to carry out pipelaying of flexible pipeline using storage reel SR2.

Preferably, the straightener assembly ST is displaceable in and out of the firing line FL as desired. The straightener assembly ST may be mounted to the tower PLT directly, or alternatively to the pipeline guide PG, or alternatively to an upper tensioner TE.

In a possible embodiment, the straightener assembly ST is mounted to the pipeline guide and is displaceable together with the pipeline guide.

Preferably upon displacing the pipeline guide PG between the primary and secondary position the straightener assembly ST is displaced at the same time between an active position downstream of the pipeline guide adjacent the departure point and adjacent the firing line FL, in order to straighten the pipeline, to a non-operable position remote of the firing line, in particular as the straightener is not required when laying flexible pipelines. It is noted that flexible pipelines often include connector fittings that are stiff and have a diameter far larger than the pipeline itself. By moving the straightener assembly to a remote position a clearance can be created for passing of such a connector fitting without being hindered by the straightener assembly. The straightener ST is shown in dashed lines in FIG. 1.

Besides the primary and secondary pipelaying position (and any other additional operational position), the pipeline guide PG may be displaceable to a non-operable position (not shown) remote from the firing line FL, e.g. to allow the vessel to carry out a J-lay pipelaying method when further equipped with J-lay equipment, e.g. as explained in WO2007108673.

The tower PLT may be pivotably attached to the vessel VE about a tower pivot axis TPA in order to set the inclination of the tower PLT relative to the vessel VE. In FIG. 1 the tower is shown in an upright position, but the tower may be pivoted to the right or left in FIG. 1 by a pivot device PM between the tower and the vessel schematically shown as a bar that has an adjustable length.

The vessel may further comprise one or more intermediate pipeline guides GU, e.g. embodied as a roller or curved chute, which are arranged on or near the deck to guide a flex pipeline to be laid from one of the storage reels, in this case storage reel SR2, to the pipeline guide PG in its the secondary pipelaying position. This manner of guiding is especially suitable for flexible pipelines, but may additionally or alternatively be provided for in combination with the other storage reel SR1 when required.

FIG. 3 depicts a marine pipeline installation vessel 1 for laying a pipeline on the seabed according to an alternative embodiment of the invention in side view. The vessel 1 comprises a foreside 1a in the direction of the bow of the vessel and an aft side 1b in the direction of the stern of the vessel 1. The vessel comprises a deck 1d and a hull 1h.

In the shown embodiment, a pipeline launch tower 10 is provided on deck 1d, in a central area of the vessel between the fore 1a and aft side 1b of the vessel. The pipeline launch tower 10 is adapted to launch the pipeline in a firing line 21, extending through a moonpool 20.

The pipeline launch tower 10 is mounted pivotably to the deck 1d via an essentially horizontally tower pivot axis 11 to adjust inclination of the tower. To this end, also a so-called adjuster 12 is provided between the pipeline launch tower 10 and the deck of the vessel, here an elevated deck portion 1d' where also the helicopter deck is foreseen.

On top of the tower 10 a crane 13 is provided. At a top end of the pipeline launch tower 10 also hoist sheaves 16a are visible, over which a hoist wire can be guided. The associated hoist winch may be provided in the hull of the vessel 1h, and the hoist wire 16h may be guided via a sheave 16b below deck accordingly. The hoist system comprising hoist wire 16h and hoist sheaves 16a may be suitable for multiple purposes, such as accessory handling, A&R purposes, or even used for lowering pipelines or pipe sections.

The pipeline launch tower 10 of the shown embodiment is provided with two tensioners 14, which in the embodiment of FIG. 3 are shown in an operational position supported by the tower and positioned in the firing line, carrying the weight of the already laid pipeline. The tensioners are each mounted to the tower 10 via a retractable frame 14', to be able to displace the tensioners from the operational position to a retracted position, in which the firing line extends outside the frames of the tensioners, e.g. to allow the passage of a large accessory.

The vessel 1 is adapted to carry out at least the reel lay method.

The vessel 1 here comprises storage reels 30, 31, 32 and 33. Two storage reels 30, 31 having a horizontal reel axis are provided on deck 1d of the vessel. In addition, two storage reels 32, 33 having a vertical reel axis are provided in the hull of the vessel 1h. In the shown embodiment, as is the case more often, the storage reels 30, 31 with the horizontal reel axis are used for the storage of rigid pipelines, while the storage reels 32, 33 with the vertical reel axis are used for the storage of flexible pipelines. To guide the flexible pipelines out of the hull 1h of the vessel pipeline guides 32a, 33a are provided above the reels 32, 33. In the shown embodiment, an additional intermediate pipeline guide 35 is provided at the fore side of the tower to guide the flexible pipeline upward along the foreside of the pipeline launch tower 10, allowing the flexible pipeline from the reels 32, 33 to enter the pipeline guide 40 at the fore side of the firing line 21.

At an elevated position of the pipeline launch tower 10, above the tensioners, a pipeline guide 40 is mounted to the tower, here shown in a primary pipelaying position relative to the tower.

In this embodiment, the pipeline guide 40 has an essentially circular pipeline guide surface member 41, also known as aligner wheel, having spokes 42 from the rim to center axis 43.

The member 41 is mounted in a frame that is pivotal relative to the pipeline launch tower 10 about a horizontal axis 45. In particular, the center axis 43 of the aligner wheel 41 is provided parallel to the axis 45 and they are connected to each other via a pivotable arm frame member 45. This construction is shown in more detail in FIG. 4.

In FIG. 3, the pipeline guide 40 is shown in the primary pipelaying position relative to the pipeline launch tower 10, in which position the pipeline guide 40 guides rigid pipeline 35 from a storage reel 30 over the pipeline guide 40 into the firing line 21. The pipeline 35 contacts the pipeline guide surface member 41 at a contact point 41c aft of the firing line 21 and departs said pipeline guide surface member 41 at a first departure point 41d and continues into the firing line 21.

In order to properly handle the rigid pipeline 35, a pipeline straightening assembly 50 is provided, which is here mounted to the pipeline guide 40, in particular in the shown embodiment to the pivotable arm 45.

According to a preferred embodiment of the invention, the pipeline straightening assembly 50 is displaceable together with the pipeline guide 40. In FIG. 3, the pipeline guide 40 is in the primary pipelaying position, and the pipeline straightening assembly 50 is then arranged in operative position thereof just downstream of the pipeline guide surface 41 adjacent the departure point 41d and adjacent the firing line 21 in order to straighten the pipeline 35.

In FIG. 4, the top end of the pipeline launch tower 10, with pipeline guide 40 and pipeline straightening assembly 50 is shown schematically.

The pipeline guide is in primary pipelaying position. The pipeline 35 contacting the pipeline guide surface of the aligner wheel 41 is not shown.

The pipeline guide here comprises a base frame member 48 which supports thereon the straightening assembly, of which here only track 50' is visible. The base frame member is pivotally connected about the axis 45 to the tower, so that base frame member 48 is pivotal between a first position, wherein the straightening assembly is aligned with the firing line, and a second position, wherein the base frame member and the straightening assembly are remote from the firing line.

The pipeline guide displacement drive comprises one or more drive members, here hydraulic cylinders 52, that are arranged between the tower and the base frame member 48 to perform the tilting of the member 48.

The aligner wheel 41 is supported by a pipeline guide support frame member 46, or arm member, that is in turn supported by the base frame member 48 so as to pivot along with the base frame member 48.

As is shown, and as preferred, the pipeline guide support frame member 46 is movable connected to the base frame member 48 so as to allow at least for adjustment of the pipeline guide surface member 41 relative to the firing line. For example one or more hydraulic cylinders 49 are provided to act as an adjustment drive arranged between the pipeline guide support frame member 46 and the base frame member 48.

This mobility may be a translatory motion, but it is preferred that the pipeline guide support frame member 46 is pivotally connected to the base frame member 48 about a pivot axis 46a. In a preferred embodiment the adjustment drive, here including cylinders 49, is embodied as a pipeline tension controller for the pipeline 35 towards the pipeline guide.

The elements of the straightening assembly, e.g. tracks and possibly one or more adjusters that allow for positioning of the tracks are mounted on the frame member 48. In FIG. 4, it is visible that the frame 48 can be secured in the first position to the tower 10 via connectors 48c.

According to the invention, a pipeline guide displacement drive is provided which is adapted to displace the pipeline guide 40 with respect to the tower 10 between the primary pipelaying position (FIG. 4) and a secondary pipelaying position (FIG. 5).

In FIG. 4 a pipeline guide displacement device comprising hydraulic cylinders 52 is visible, for displacing the pipeline guide 40 at least between the primary and secondary pipelaying position. It is noted that the crane 13, provided on top of the pipeline launch tower 10, may also be suitable to function as a pipeline guide displacement drive.

In FIG. 5, the pipeline guide displacement device has displaced the pipeline guide 40 and the straightening assembly 50 with respect to the pipeline launch tower 10 to the secondary pipelaying position, here by pivoting the pipeline guide 40 and the straightening assembly 50 together in the pivoting direction P. The displacement took place as follows: both the frame 48 and the pivotable arm 46 connected thereto were pivoted in pivot direction P about axis 45, about approximately 90°. As such, the frame 48 no longer extends vertically, with the straightener tracks 50' adjacent the firing line, but now extends essentially horizontally, with the straightener tracks essentially below the aligner wheel in a non-operative location.

In the secondary pipelaying position of FIG. 5 the pipeline guide 40 is adapted to guide a pipeline 35', primarily a flex pipeline as the straightener is non-operable, over the pipeline guide surface 41 from a storage reel (not visible) into the firing line 21, wherein said pipeline 35' contacts the pipeline guide surface at a first contact point 41c' (position globally indicated) fore of the firing line 21 and departs said surface 41 at a first departure point 41d' into the firing line 21.

The first and second departure points 41d, 41d' are both adjacent the firing line 21, and the first and second contact points 41c, 41c' are positioned here geometrically opposite each other, fore and aft of the firing line, respectively. In the primary pipelaying position of FIG. 5, the straightening assembly 50 has thus moved out of the firing line 21, allowing flexible pipelines to be laid, and any connector fittings thereof to pass without being hindered.

It is noted that the pivotable arm 46 is connected pivotably to the frame 48 about an arm pivot axis 46a. Due to this configuration, the pipeline guide 40 may be allowed to pivot even further in pivot direction P' with respect to the pipeline launch tower 10. The pipeline guide is accordingly moved away from the pipelaying position of FIG. 5 and away from the firing line 21 towards the pipeline launch tower 10 to a retracted, non-operable position shown in FIG. 6. In this position, the firing line 21 is completely free to perform other operations.

In the shown embodiment, the pivotable arm is provided with rollers 46r to guide an item that is to enter the firing line and pass the pipeline guide 40 and pivotable arm 46.

In FIG. 7 the marine pipeline installation vessel 1 is shown again, but now with the pipeline guide 40 is in the retracted, non-operable position in side view. As explained above, the firing line 21 is now free for the passage of large items, such as item 60, e.g. a buoyancy tank for a riser or a pipeline accessory such as an end terminal or a mid-pipeline connector, in FIG. 7. The vessel is preferably equipped with a crane to handle such a large item 60 and hoist it into the firing line with the tensioners retracted, e.g. as described in WO2007108673.

In FIG. 8, the pipeline guide 40 is still in the retracted, non-operable position, but now the pipeline launch tower 10 has pivoted 30°. In this position, the vessel is suitable for performing J-lay pipelaying FIG. 8 depicts the marine pipeline installation vessel of FIG. 7 wherein J-lay pipelaying is performed as the vessel is also equipped with J-lay equipment.

In this example for J-laying of pipeline it is envisaged that the upper tensioner is brought in its retracted position, while the lower tensioner is in its active position. The "space" thus created next to the tower at the height of the upper tensioner is now used to arrange equipment and work space for J-laying.

Adjacent the tower 10 a pipe loader 130 has been placed comprising a boom structure 131 which can be pivoted about pivot structure between a horizontal loading position and a raised unloading or transfer position. One or more (hydraulic) actuators have been arranged for tilting the boom structure 131. It is preferred to have the pivot structure arranged such that the pivot axis coincides with the pivot axis of the tower.

The boom structure 131 is provided with a gripper assembly 134 for gripping a single or a double length pipe section, i.e. two normal 40 foot (12 meters) lengths of pipe welded together (either on the vessel or earlier).

For "loading" the pipe section for J-lay it is envisaged that the section, which is on the deck (e.g. in a suitable rack) is gripped with the boom structure 131 horizontal. Then the boom structure 131 and the section brought in line with the firing line. The pipe loader 130 can have another design as long as it is able to sequentially supply (single or double lengths or otherwise) pipe sections to an elevated position aligned with the firing line in the tower, e.g. above the lower tensioner. It is noted that J-laying may also be done with all tensioners retracted if a suitable hang-off clamp is provided to hold the launched pipeline. Such a hang-off clamp e.g. at the lower end of the tower or on the hull of the vessel, can be envisaged in all embodiments of the invention if desired.

At the height of the upper tensioner here the tower 10 also is provided with J-lay equipment 150 which is displaceable between an active and retracted position.

In the retracted position this J-Lay equipment 150 may be arranged on a lateral side of the tower.

In the active position the J-Lay equipment 150 is arranged so as to allow operation(s) with regard to pipeline arranged in the firing line 21.

The J-Lay equipment 150 here includes an external pipe section alignment device, which may include one or more pipe clamps as well as associated actuators for effecting alignment movements of these clamps in order to accurately align the lower end of the new pipe section with the upper end of the pipeline held by the lower tensioner.

In this example the equipment 150 further includes a pipe section work station, e.g. a welding station. Welding equipment can be arranged in said welding station to weld the pipeline ends together.

Above the external pipe section alignment device here a roller assembly may be provided for laterally supporting the pipe section.

A second work station 160, e.g. for coating the pipeline, e.g. in the area of a weld or other connection, is proposed, here near the moonpool below the lower tensioner 14. The station 160 could also be mounted (in a dismountable manner when desired) on the tower at said location.

When performing J-Lay operation it is sometimes desired to arrange the tower 10 at an incline as is known from the art. FIG. 8 shows that such tilting is possible with all J-Lay equipment 150 on said tower 10 (and the loader 130) still being functional.

It will be clear that when performing J-lay a new pipe section will be brought above the upper end of the launched pipeline held by the lower tensioner 14 and aligned with said upper end. Then welding (or otherwise) will be performed. The lower tensioner 14 will then effect a controlled lowering of the pipeline.

FIGS. 9-13 show an alternative version of the top end of the tower 10, wherein the member 48 is generally L-shaped instead of C shaped as in FIGS. 3-8. This allows for an even greater cleared envelope when the pipeline guide is in its fully retracted position (see FIG. 11). All members have been denoted with the same reference numerals, and the function will be readily understood from the figures and the preceding explanation.

Figure 1:
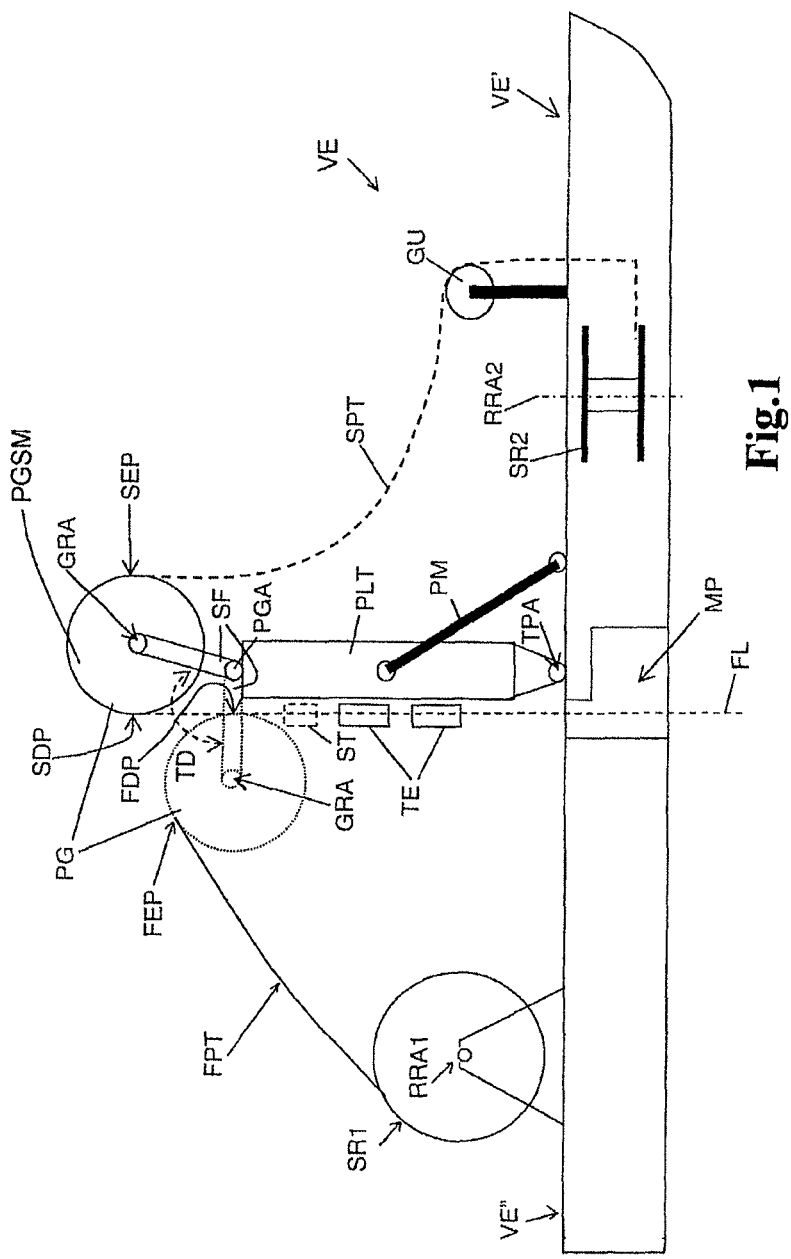
Figure 2:
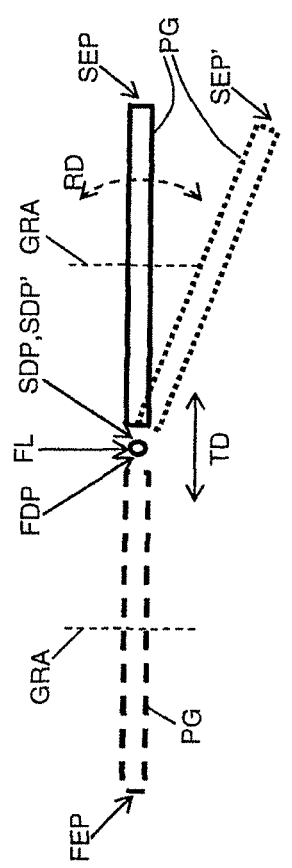
Figure 3:
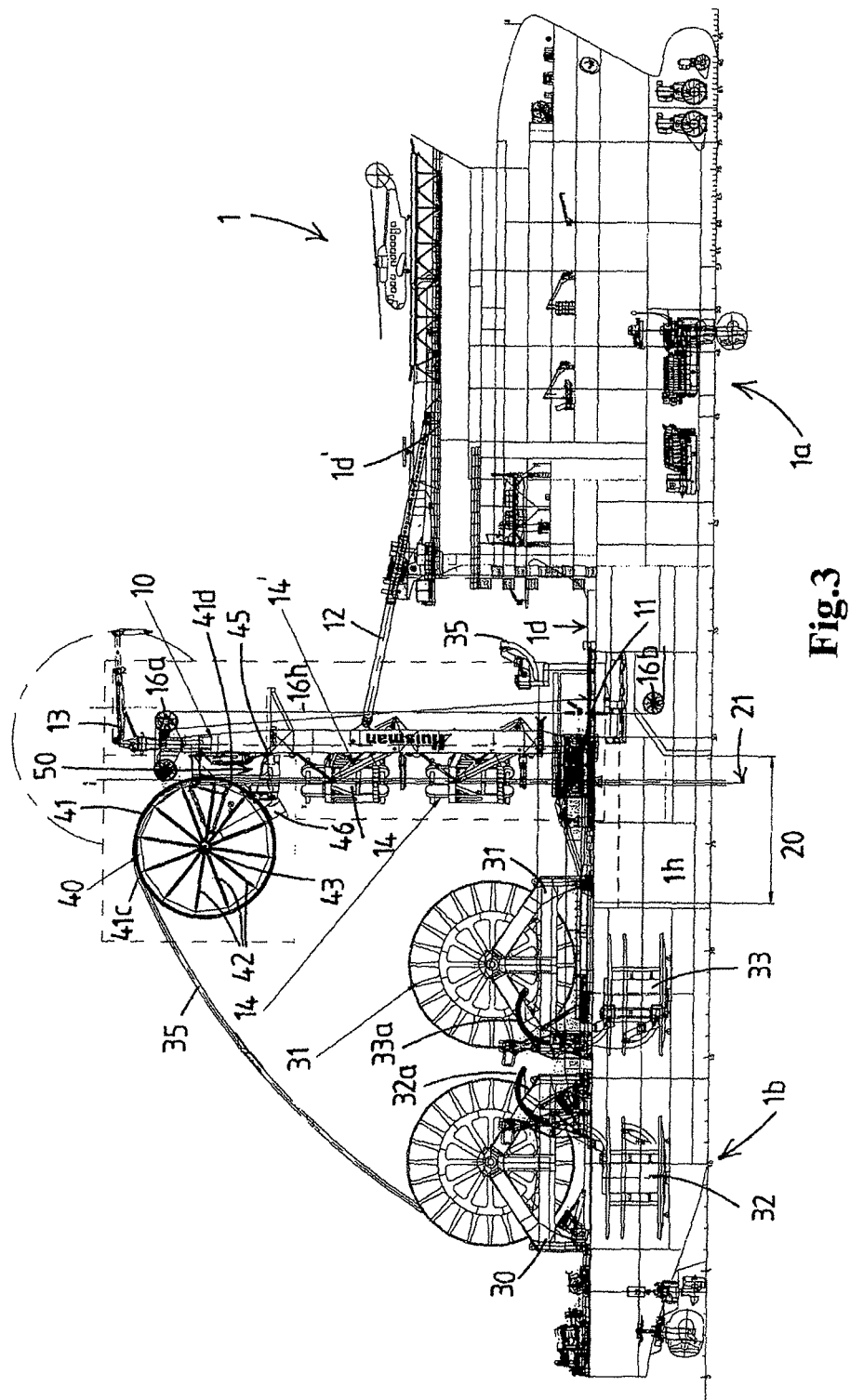
Figure 4:
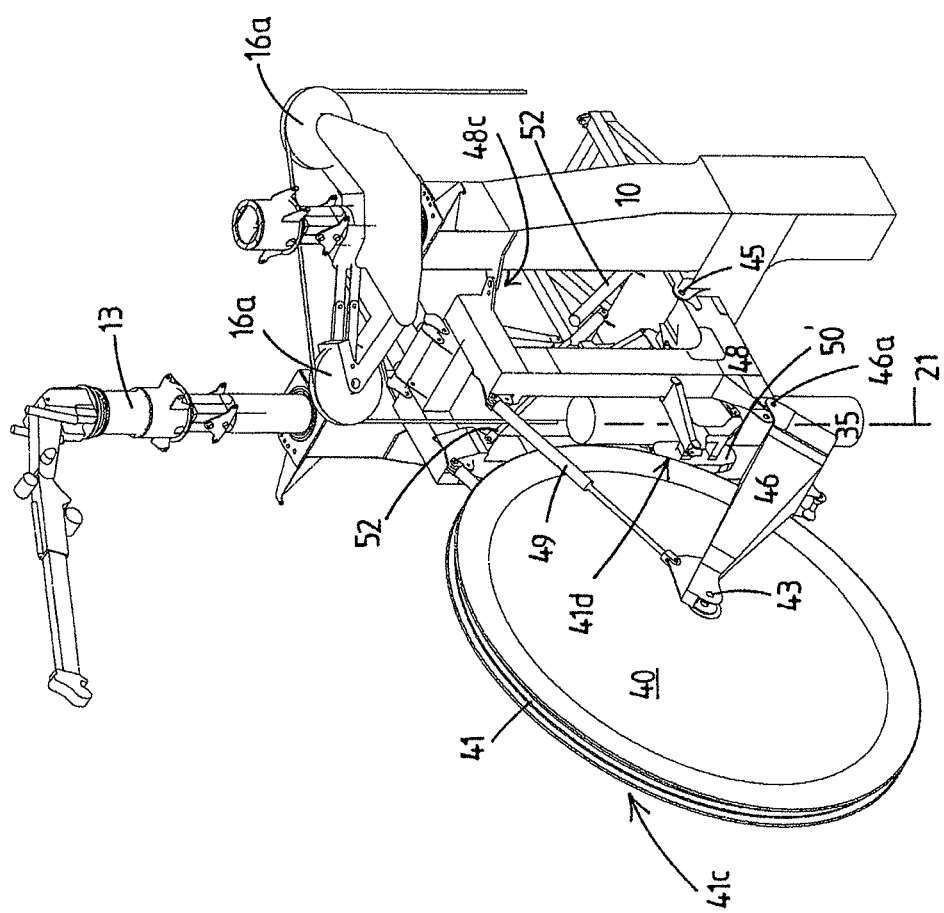
Figure 5A:
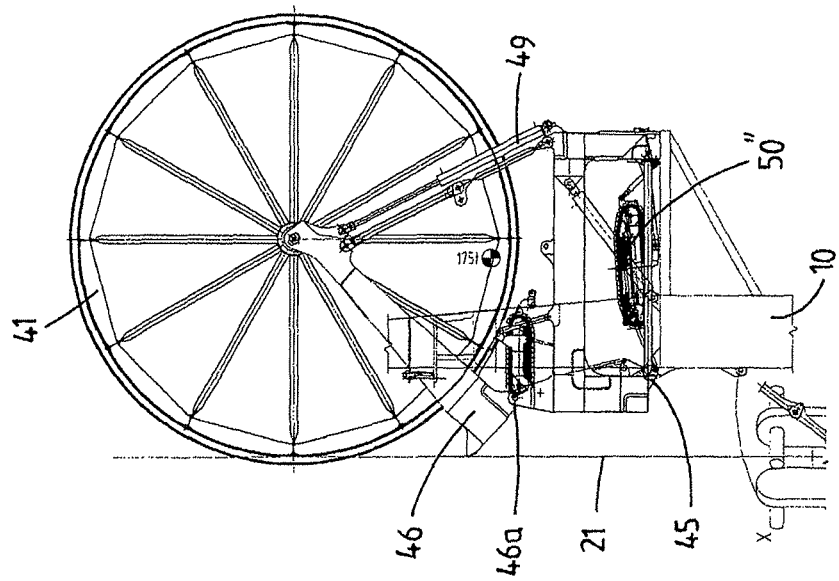
Figure 4A:
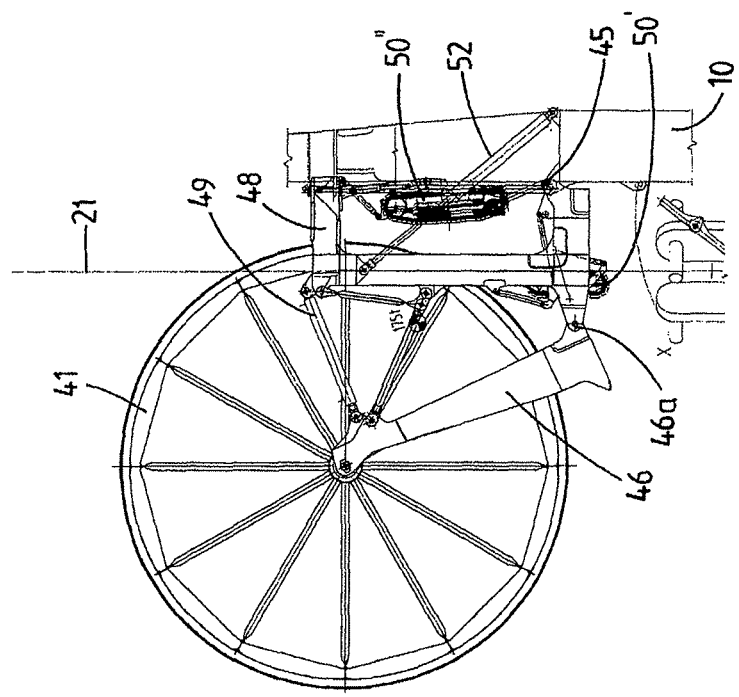
Figure 6:
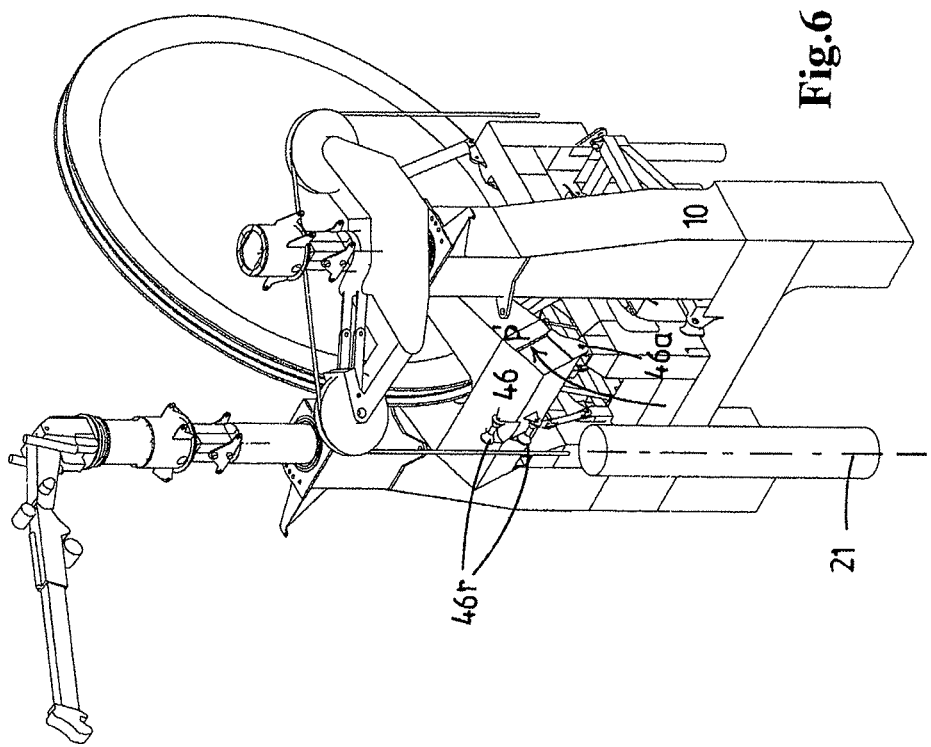
Figure 7:
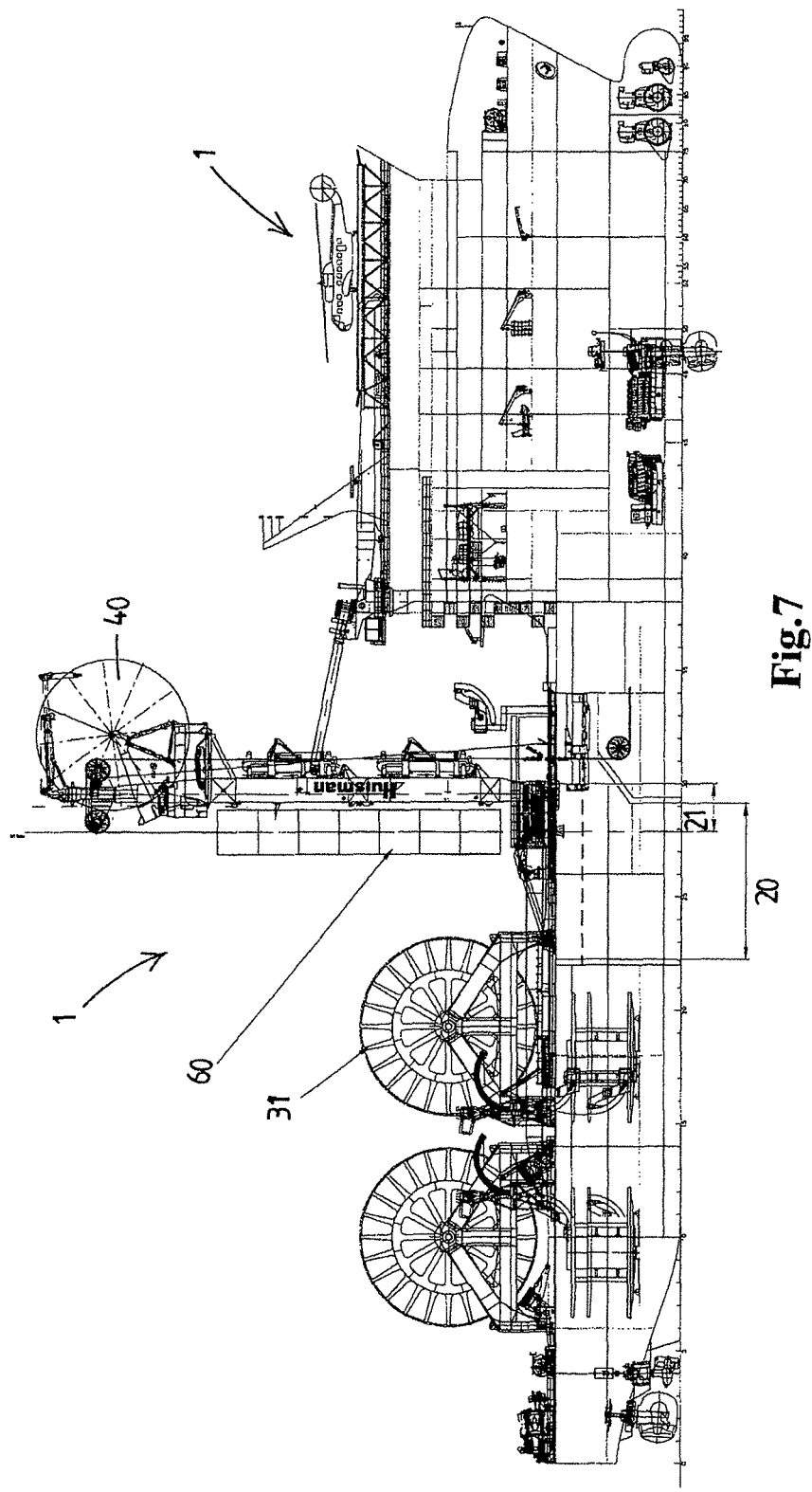
Figure 8:
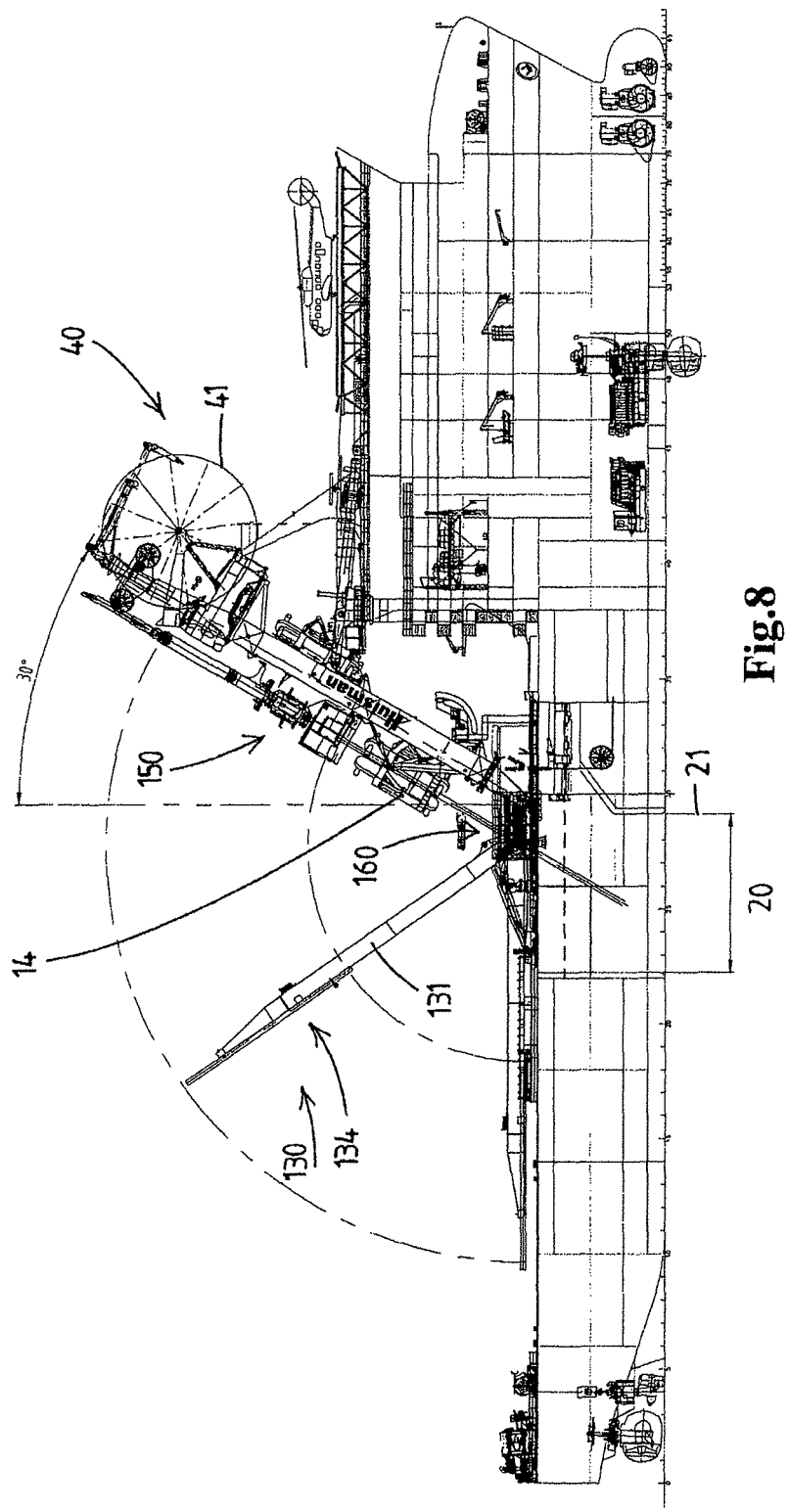
Figure 9:
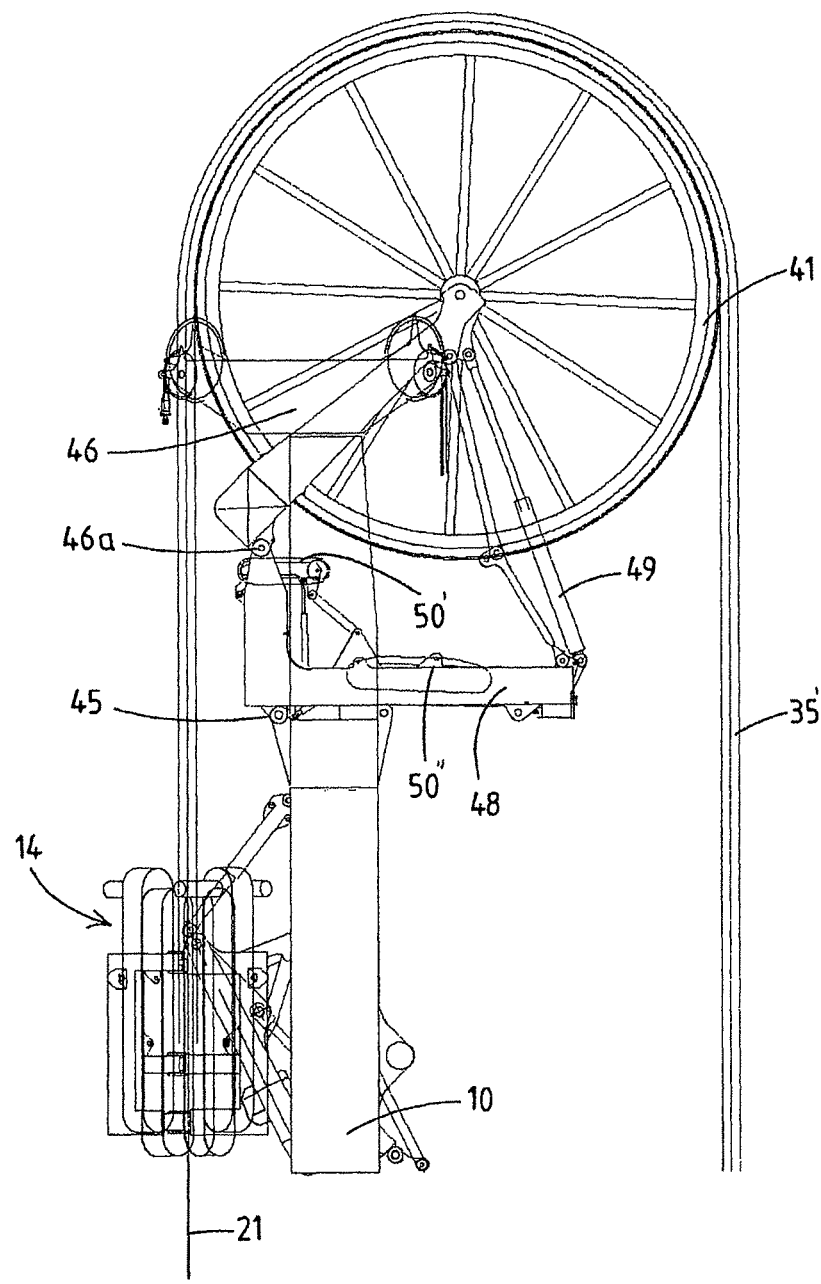
Figure 10:
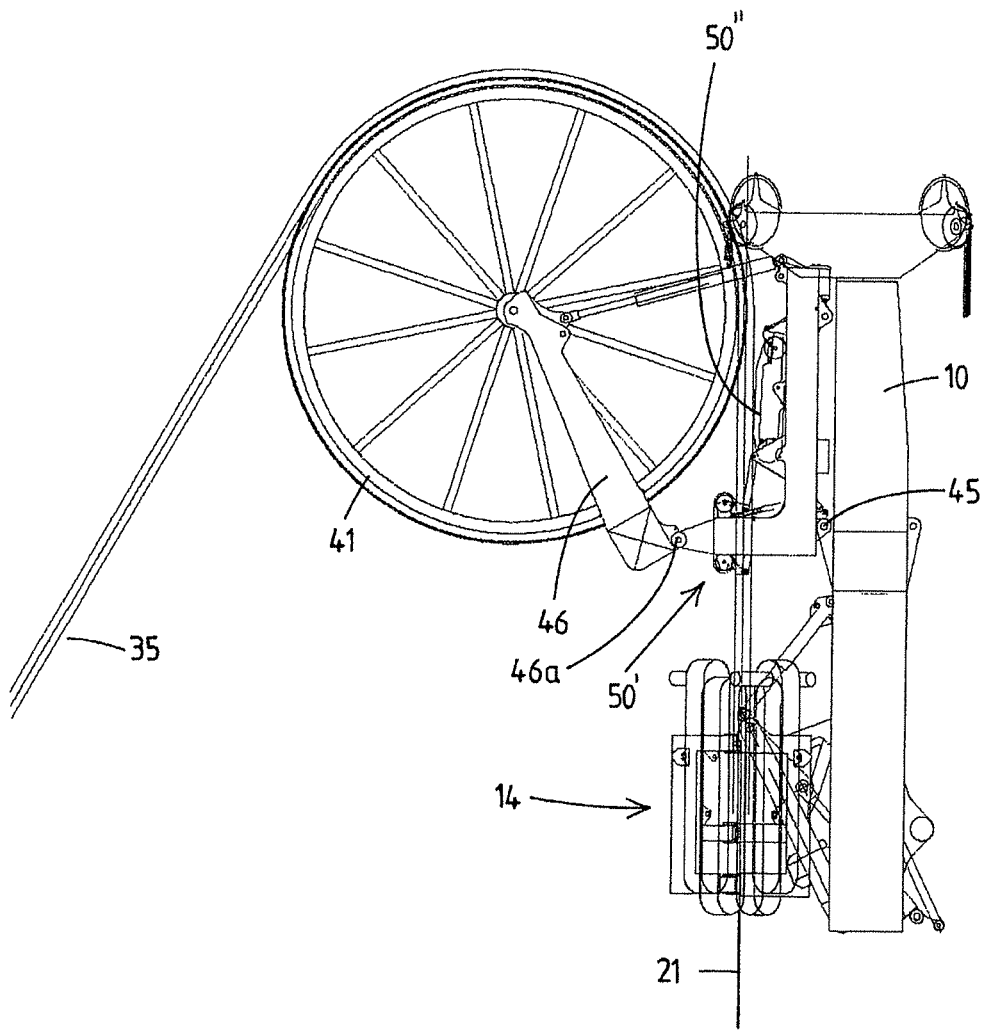
Figure 11:
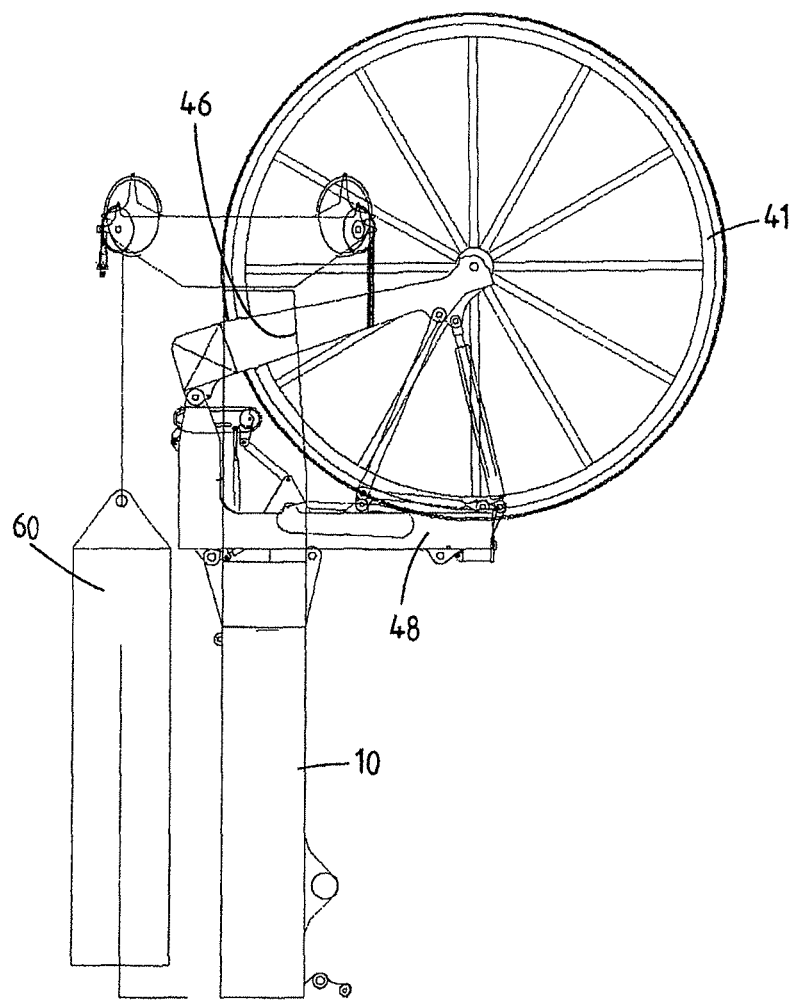
Figure 12:
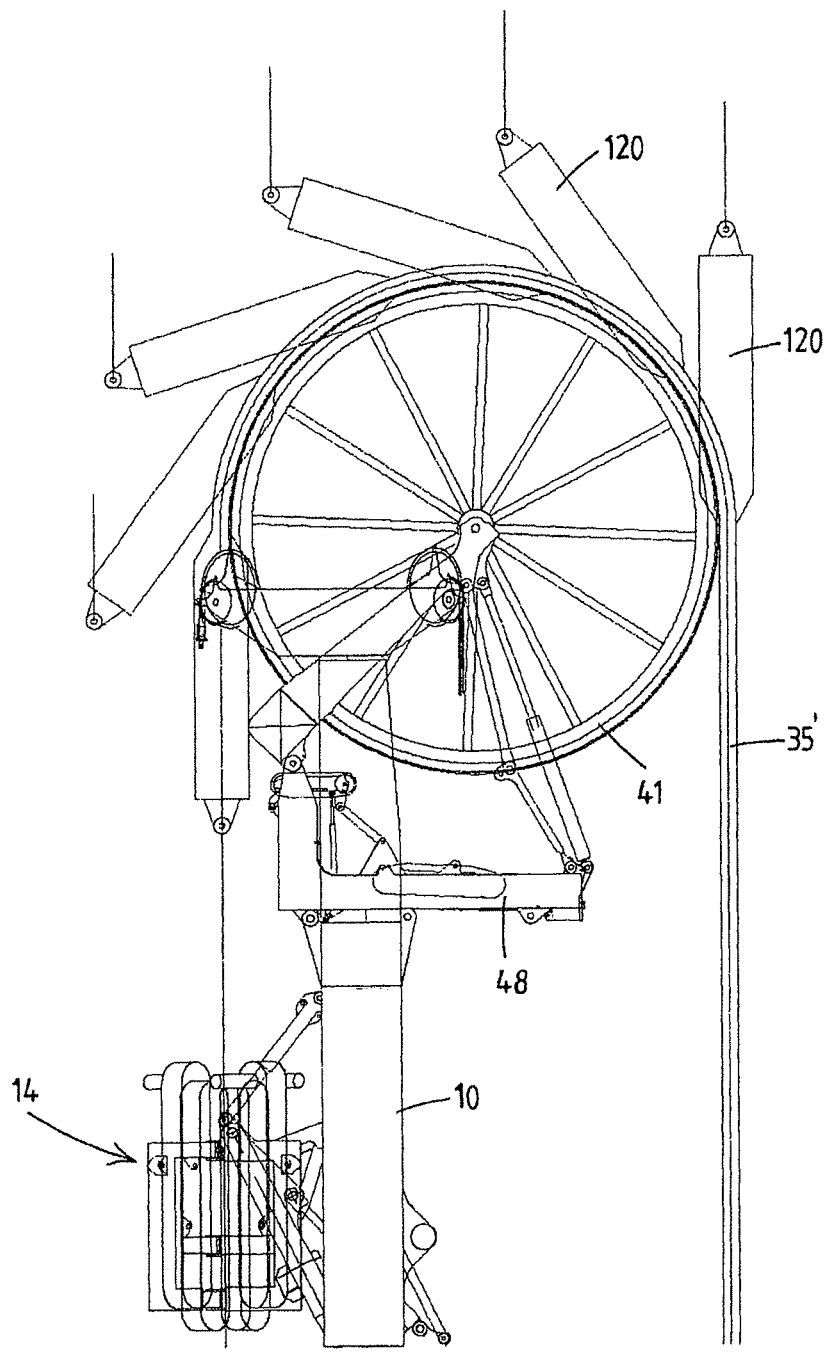
FIG. 12 illustrates that a first end pipeline connector or terminal 120 is passed over the aligner wheel 41, e.g. using a crane.
Figure 13:
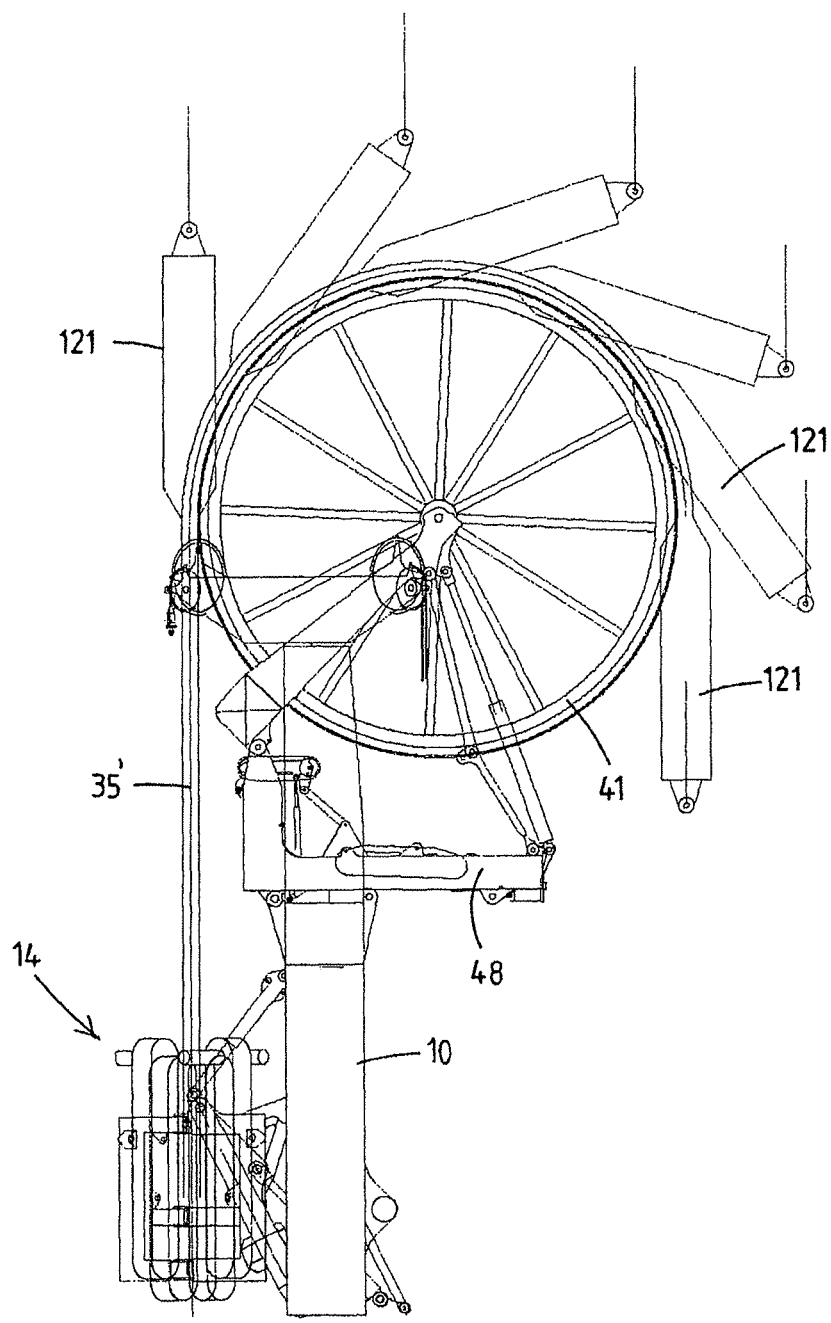
FIG. 13 illustrates the same for a trailing end pipeline connector or terminal 121 of pipeline 35'.

The invention claimed is:

1. A marine pipeline installation vessel for laying a pipeline on a seabed, said vessel at least being adapted to carry out a reel lay method, wherein the vessel comprises:
  a storage reel for storage of the pipeline to be laid;
  a pipeline launch tower mounted to the vessel, which pipeline launch tower is adapted to launch the pipeline in a firing line along said tower;
  a pipeline guide which is adapted to, in a pipelaying position thereof, guide a pipeline from a storage reel over the pipeline guide, and into the firing line, said pipeline guide comprising:
    a pipeline guide surface member providing an essentially circular or semi-circular pipeline guide surface; and a base frame member, via which the pipeline guide is mounted at an elevated position to the pipeline launch tower; and a pipeline straightening assembly supported by the base frame member of the pipeline guide, wherein the pipeline straightening assembly is adapted to, in an operative position thereof downstream of the pipeline guide adjacent the firing line, straighten the pipeline being guided into the firing line, wherein the base member is pivotally connected about an axis to the tower and the pipeline straightening assembly is movable with respect to the pipeline guide surface member so that the base frame member is pivotal between a first straightening position thereof, wherein the pipeline guide is in a pipelaying position and the straightening assembly is in an operative position, and a second position, wherein the base frame member and the pipeline straightening assembly are remote from the firing line and the pipeline straightening assembly is in a non-operative position while the pipeline guide surface member is in an operative position, wherein a displacement drive for the base frame member is provided that comprises one or more drive members arranged between the tower and the base frame member to perform the tilting of the base frame member, and wherein the pipeline guide surface member is supported by a pipeline guide support frame member, that is supported by the base frame member so as to pivot along with the base frame member.

2. The vessel according to claim 1, wherein the pipeline guide support frame member is movable connected to the base frame member so as to allow at least for adjustment of the pipeline guide surface member relative to the firing line.

3. The vessel according to claim 1, wherein the mobility of the pipeline guide support frame member relative to the base frame member is a translatory motion.

4. The vessel according to claim 1, wherein the pipeline guide support frame member is pivotally connected to the base frame member about a pivot axis.

5. The vessel according to claim 1, wherein one or more hydraulic cylinders are provided to act as an adjustment drive arranged between the pipeline guide support frame member and the base frame member.

6. The vessel according to claim 1, wherein the adjustment drive is embodied as a pipeline tension controller for the pipeline towards the pipeline guide.

7. The vessel according to claim 1, wherein the elements of the straightening assembly are mounted on the base frame member.

8. The vessel according to claim 7, wherein the elements of the straightening assembly comprise tracks.

9. The vessel according to claim 8, wherein the elements of the straightening assembly comprise one or more adjusters that allow for positioning of the tracks.

10. The vessel according to claim 1, wherein the launch tower is mounted pivotable to the vessel about an essentially horizontal tower pivot axis to adjust inclination of the tower.

11. The vessel according to claim 1, wherein the straightening assembly comprises one or more straightening tracks to undo plastic deformation of the pipeline.

12. The vessel according to claim 1, wherein in the second position of the base frame member, straightener tracks extend essentially horizontally below the pipeline guide.

13. The vessel according to claim 1, wherein the displacement drive comprises one or more hydraulic cylinders.

14. The vessel according to claim 1, wherein the pipeline guide support frame member comprises an arm member.

15. The vessel according to claim 1, wherein the vessel is provided with one or more tensioners, said tensioners comprising:
a tensioner frame; and
multiple endless tracks, adapted for engaging the pipeline and supporting at least part of the weight of the launched pipeline,
wherein said one or more tensioners in an operational position being positioned in the firing line, carrying the weight of the already laid pipeline, supported by said tower via an associated tensioner support assembly.

16. The vessel according to claim 15, wherein the one or more tensioners are displaceable with respect to the tower between an active position, in which the firing line extends through the tensioner frame between the tracks, so that the tracks can engage on a pipeline, and a retracted position, in which the firing line extends outside the frame of the tensioner to allow the passage of an accessory.

17. The vessel according to claim 1, wherein the pipeline guide is adapted to, in the first straightening position of the base frame member, guide a pipeline, from the storage reel, over the pipeline guide into the firing line, wherein said pipeline contacts the pipeline guide surface fore of the firing line and departs the pipeline guide surface into the firing line.

18. The vessel according to claim 1, wherein the pipeline guide is adapted to, in the second position of the base frame member, guide a pipeline, from the storage reel, over the pipeline guide into the firing line, wherein said pipeline contacts the pipeline guide surface aft of the firing line and departs the pipeline guide surface into the firing line.

19. A method for laying a pipeline on a seabed, comprising the step of using the vessel according to claim 1 to lay the pipeline on the seabed.

20. The method according to claim 19, further comprising the step of allowing the passage of larger items over the pipeline guide in the second straightening position of the base frame member.

21. The method according to claim 20, wherein the vessel comprises a flexible pipeline, the method further comprising the following steps:
providing the base frame member in the second operative position;
carrying out flexible pipelaying, without using the straightening assembly in a non-operative position thereof.

22. The method according to claim 19, wherein the vessel comprises a rigid pipeline, the method further comprising the following steps:
providing the base frame assembly in the first straightening position; and
carrying out rigid pipelaying, using the pipeline straightening assembly in the operative position of the straightening assembly.

* * * * *